Sept. 11, 1928.
F. SUMMERS
AUGER
Filed June 2, 1927
1,684,291
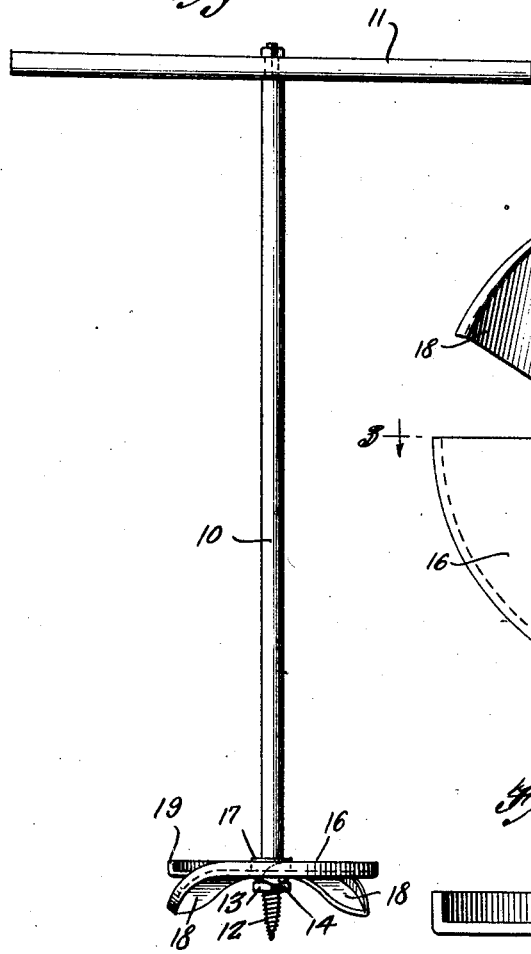
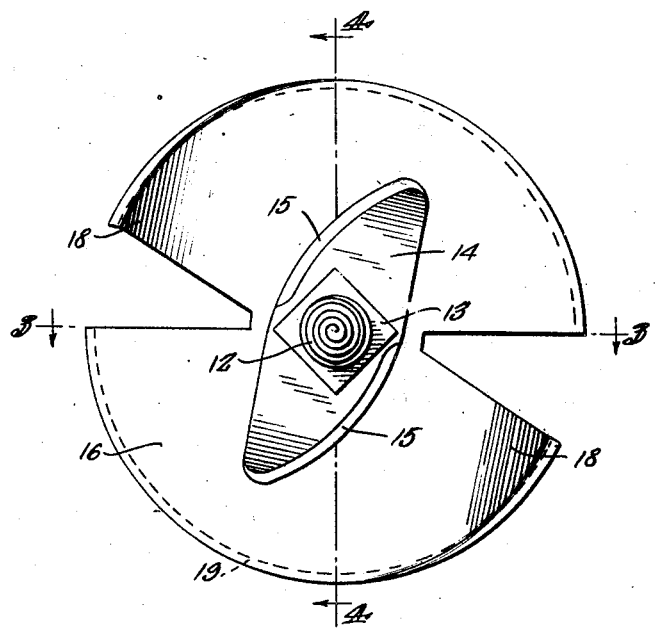
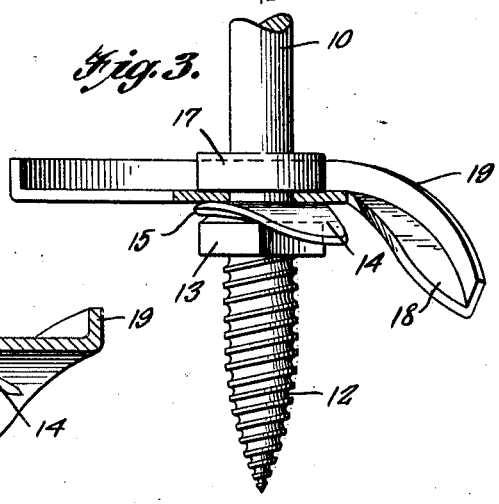
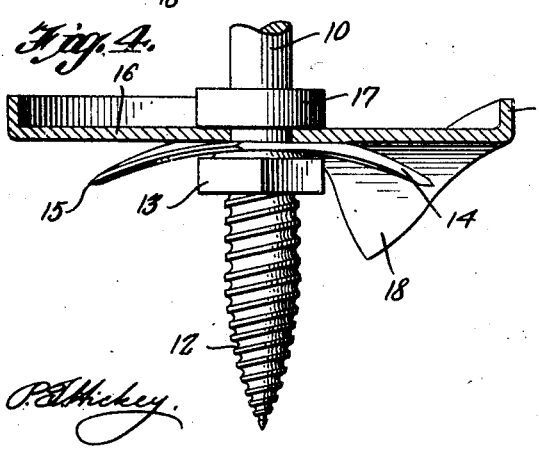
Frank Summers,
INVENTOR Patented Sept. 11, 1928.

1,684,291

UNITED STATES PATENT OFFICE.

FRANK SUMMERS, OF MEMPHIS, TENNESSEE, ASSIGNOR OF ONE-HALF TO LEOPOLD URBANCIC, OF MEMPHIS, TENNESSEE.

AUGER.

Application filed June 2, 1927. Serial No. 196,054.

This invention relates to augers primarily adapted for digging post holes and which embodies among other characteristics a handle member provided with a spiraled end for drawing the handle member within the ground when the same is called into use.

Another object of the invention comprehends a propeller member adapted to break up the soil around the path pursued by the spiraled end.

A further object of the invention contemplates a disk member.

More specifically stated the disk member is provided with blade portions adapted to cut and lift the earth upon the disk primarily loosened by the propeller.

An additional object of the invention consists of a flange portion upon the disk to prevent the side edges thereof from cutting into the side walls of the post hole and to prevent the deposited earth from falling back within the hole.

With the above and other objects in view the invention further consists of the following novel features and details of construction to be hereinafter more fully described, illustrated in the accompanying drawing, and pointed out in the appended claim.

In the drawing:

Figure 1 is an elevation of the invention.

Figure 2 is a bottom plan view thereof.

Figure 3 is a sectional view taken on line 3—3 of Figure 2.

Figure 4 is a sectional view taken on line 4—4 of Figure 2 and at right angles to that of Figure 3.

Referring to the drawing in detail, wherein like characters of reference denote corresponding parts, the reference character 10 indicates a handle member provided with a cross bar 11 upon one end.

The opposed end of the handle member is provided with a spirally threaded and tapered portion 12 adapted to penetrate, guide and draw the handle member within the ground. A nut or other enlargement 13 carried at an appropriate point upon the length of the handle member 10 and immediately above the portion 12 is adapted to support a curvilinear helically pitched propeller 14 which is in turn provided with sharpened edges 15 on the depending portions when rotated in a clockwise direction. Said propeller is adapted to cut and break up the earth around the path or direction taken by the portion 12.

A disk member 16 carried by the handle member 10 is interposed between the upper side of the propeller 14 and a collar 17. All of the elements may be locked, keyed, brazed, sweated or otherwise fixed upon the handle member 10 or manufactured as integral portions thereof.

However in this instance the parts are removable to facilitate replacement when the blades become broken when encountering stones and other obstructions within the soil. Said disk is provided with portions removed upon diametrically opposite sides thereof and which are of configurations similar to that of wedges, that is, being wider at the peripheral edges of the disk than at points adjacent the connection of the handle member therewith. Those edges exposed by the portions removed when said disk is rotated in a clockwise direction depend from the plane of the major portion thereof as indicated at 18 and which are also sharpened after the manner of the edges 15 of the propeller 14. The depending portions 18 of the disk 16 are not only adapted to cut within the soil other than that loosened by the propeller 14 by which due to the inclinations thereof will direct and deposit the soil upon the upper surface of the disk. An upstanding flange portion 19 carried upon the peripheral edges of the disk 16 is adapted to prevent loss of the deposited dirt as in the instance of the same falling back within the hole and which also prevents, to a marked degree, the biting of said edges within the side walls of the post hole.

It is obviously understood that the pitch of the propeller and of the depending portions 18 of the disk 16 may be altered in the instance of the user being left handed and capable of operating the device in an anticlockwise direction more effectively.

The invention is susceptible of various changes in its form, proportions and minor details of construction, and the right is herein reserved to make such changes as properly fall within the scope of the appended claim.

Having thus described the invention, what is claimed is:

A post hole digger comprising a handle member provided with a spirally threaded end portion, a propeller blade carried by the handle member immediately above the spirally threaded end and which is helically pitched and curvilinear to dispose the extremities thereof downwardly toward the earth in order that the earth may be readily broken up about the course pursued by the aforementioned end, a disk member mounted upon the handle, said disk having portions removed upon diametrically opposite sides thereof, depending portions upon the disk being extended to greater depths than the ends of said propeller, and an upstanding flange portion provided upon the marginal edges of the disk and depending portions to prevent displacement of the earth deposited upon the disk and from injuring the side walls of the post hole.

In testimony whereof I affix my signature.

FRANK SUMMERS.